(12) United States Patent
Dykeman et al.

(10) Patent No.: US 12,262,840 B2
(45) Date of Patent: Apr. 1, 2025

(54) DIFFUSER ASSEMBLY

(71) Applicant: SharkNinja Operating LLC, Needham, MA (US)

(72) Inventors: David Conor Dykeman, Framingham, MA (US); Eamon Joseph Mccarthy, Brighton, MA (US); Scott John Shaw, Waltham, MA (US)

(73) Assignee: SharkNinja Operating LLC, Needham, MA (US)

( * ) Notice: Subject to any disclaimer, the term of this patent is extended or adjusted under 35 U.S.C. 154(b) by 0 days.

(21) Appl. No.: 17/707,516

(22) Filed: Mar. 29, 2022

(65) Prior Publication Data

US 2023/0309738 A1 Oct. 5, 2023

(51) Int. Cl.
*A47J 31/44* (2006.01)
*A23F 5/26* (2006.01)

(52) U.S. Cl.
CPC ............. *A47J 31/4478* (2013.01); *A23F 5/26* (2013.01)

(58) Field of Classification Search
CPC ................................ A47J 31/4478; A23F 5/26
USPC ............................................................ 99/306
See application file for complete search history.

(56) References Cited

U.S. PATENT DOCUMENTS

| | | | | |
|---|---|---|---|---|
| 3,626,839 A | * | 12/1971 | Martin ................ | A47J 31/4478 99/315 |
| 4,056,050 A | * | 11/1977 | Brown ................ | A47J 31/0573 99/305 |
| 4,630,532 A | * | 12/1986 | Sonnentag ............. | A47J 31/44 99/279 |
| 6,244,162 B1 | * | 6/2001 | Dahmen ............. | A47J 31/4478 426/433 |
| 6,755,119 B1 | | 6/2004 | Lyall et al. | |
| 7,013,795 B2 | | 3/2006 | Mulle et al. | |
| 7,669,519 B2 | | 3/2010 | Pope et al. | |
| 7,685,932 B2 | | 3/2010 | Rahn et al. | |
| 7,866,255 B1 | | 1/2011 | Wroblewski et al. | |
| 8,327,755 B1 | | 12/2012 | Michalek et al. | |

(Continued)

FOREIGN PATENT DOCUMENTS

| CN | 208658874 U | 3/2019 |
|---|---|---|
| CN | 211883421 U | 11/2020 |

(Continued)

*Primary Examiner* — Steven W Crabb
*Assistant Examiner* — Ket D Dang
(74) *Attorney, Agent, or Firm* — Mintz, Levin, Cohn, Ferris, Glovsky and Popeo, P.C.

(57) ABSTRACT

A diffuser assembly for diffusing fluid in a brewed beverage system is provided. The diffuser assembly includes a diffuser housing having an inlet port configured to receive fluid from a fluid supply, a channel in fluid communication with the inlet port, and a cavity in fluid communication with the channel. The diffuser housing further includes multiple elongate openings formed in an inner surface of the diffuser housing for allowing fluid within the cavity to flow there through. The diffuser housing also includes multiple ridges projecting from the inner surface of the diffuser housing and positioned to distribute the fluid evenly across the inner surface prior to outputting the fluid via the plurality of elongate openings. The diffuser assembly can further include a cover removably coupled to the diffuser housing. Related systems and methods are also provided.

12 Claims, 9 Drawing Sheets

(56) References Cited

U.S. PATENT DOCUMENTS

| | | | |
|---|---|---|---|
| 9,084,511 | B2 | 7/2015 | Clark et al. |
| 9,370,274 | B2 | 6/2016 | Bodum |
| 9,398,828 | B1 | 7/2016 | Wroblewski et al. |
| 9,844,295 | B2 | 12/2017 | Guo et al. |
| 9,930,989 | B2 | 4/2018 | Rosati et al. |
| 10,194,768 | B2 | 2/2019 | Van Der Woning et al. |
| 10,307,012 | B2 | 6/2019 | Hart et al. |
| 10,925,429 | B2 | 2/2021 | Sachtleben |
| 10,932,607 | B2 | 3/2021 | Marschke et al. |
| 2012/0052171 | A1 | 3/2012 | Starr et al. |
| 2017/0000290 | A1* | 1/2017 | Van Der Woning ............... A47J 31/4478 |
| 2017/0172338 | A1 | 6/2017 | Burrows |

FOREIGN PATENT DOCUMENTS

| | | | | |
|---|---|---|---|---|
| DE | 202006002345 | U1 * | 8/2007 | .............. A47J 31/06 |
| EP | 1502526 | B1 | 6/2007 | |
| EP | 1502526 | B8 | 9/2007 | |
| EP | 1842465 | A3 | 3/2008 | |
| EP | 3116356 | A4 | 1/2018 | |
| EP | 3893703 | A1 | 10/2021 | |
| KR | 101832756 | B1 | 2/2018 | |
| KR | 101832767 | B1 | 4/2018 | |
| WO | WO-2005044065 | A2 * | 5/2005 | .............. A47J 31/06 |
| WO | 2015136367 | A2 | 9/2015 | |
| WO | 2020120031 | A1 | 6/2020 | |

* cited by examiner

DIFFUSER ASSEMBLY

FIELD

A diffuser assembly and methods for use of a diffuser assembly are provided for brewing beverages.

BACKGROUND

Brewed beverage systems provide a fluid to a flavorant during a brewing cycle to form a brewed beverage. The fluid is provided to the flavorant to wet or soak the flavorant causing flavor-producing dissolved solids to be extracted from the flavorant. The distribution of the fluid onto the flavorant can affect the quality and taste of the resulting brewed beverage. Undesirable flavors and qualities of the brewed beverage can result from uneven or concentrated distribution of the fluid on to the flavorant.

Accordingly, there is a need for improved devices and methods for evenly distributing fluids onto a flavorant in a brewed beverage system.

SUMMARY

A diffuser assembly, a coffee machine, and methods of brewing coffee with a coffee machine are provided. Related apparatuses and techniques are also described.

In one embodiment, a diffuser assembly for diffusing fluid in a brewed beverage system is provided. The diffuser assembly can include a diffuser housing configured to receive a fluid from a fluid supply. The diffuser housing can have an inlet port at which the fluid is received from the fluid supply, a cavity in fluid communication with the inlet port, a plurality of elongate openings formed in an inner surface of the diffuser housing for allowing fluid within the cavity to flow there through, and at least one ridge projecting from the inner surface of the diffuser housing and positioned to distribute the fluid evenly across the inner surface prior to outputting the fluid via the plurality of elongate openings. The diffuser assembly can also include a cover removably coupled to the diffuser housing.

One or more of the following features can be included in any feasible combination. For example, the cavity can be defined by a first substantially cylindrical portion of the diffuser housing, and the channel can be defined by a second portion of the diffuser housing extending outward from the first substantially cylindrical portion. In another example, the plurality of elongate openings can be substantially arc-shaped. In another example, the plurality of elongate openings can include a first plurality of elongate openings and a second elongate opening. The first plurality of elongate openings can be arranged concentric relative to one another, and the second elongate opening may not be concentric with the first plurality of elongate openings. In another example, each of the plurality of elongate openings can differ in size relative to one another. In another example, each of the plurality of elongate openings can have a length that differs relative to one another. In another example, the ridge(s) can intersect the plurality of elongate openings. In another example, the ridge(s) can include a primary ridge having a first length and a plurality of secondary ridges having a second length that is less than the first length. In another example, the primary ridge can be positioned between the plurality of secondary ridges.

In another embodiment, a coffee machine for brewing a beverage is provided. The coffee machine can include a reservoir containing a fluid for brewing the beverage, and a brew basket in fluid communication with the reservoir. The brew basket can be configured to hold a flavorant and to receive the fluid from the reservoir. The coffee machine can also include a diffuser assembly having at least one ridge arranged on the inner surface thereof and configured to divert the fluid to a plurality of elongate openings formed in the diffuser assembly such that the fluid is evenly distributed across the inner surface of the diffuser assembly and onto the flavorant within the brew basket in a substantially uniform circular pattern. The machine can further include a showerhead configured to receive the fluid from the reservoir via the diffuser assembly and to provide the fluid to the brew basket.

One or more of the following features can be included in any feasible combination. For example, each of the plurality of elongate openings can be substantially arc-shaped. In another example, the plurality of elongate openings can include a first plurality of elongate openings and a second elongate opening. The first plurality of elongate openings can be arranged concentric relative to one another, and the second elongate opening may not be concentric with the first plurality of elongate openings. In another example, each of the plurality of elongate openings can differ in size relative to one another. In another example, each of the plurality of elongate openings can have a length that differs relative to one another. In another example, the ridge(s) can intersect the plurality of elongate openings. In another example, the ridge(s) can include a primary ridge having a first length and a plurality of secondary ridges having a second length that is less than the first length. In another example, the primary ridge can be positioned between the plurality of secondary ridges.

In another embodiment, a method of brewing coffee with a coffee machine is provided. The method can include delivering fluid from a reservoir to a diffuser assembly arranged within a showerhead of a coffee machine. The diffuser assembly can have at least one ridge that diverts the fluid to a plurality of elongate openings formed in the diffuser assembly such that the fluid can be distributed evenly within the diffuser assembly. The fluid can flow through the plurality of elongate openings and onto a flavorant within a brew basket of the coffee machine in a substantially uniform circular pattern across the flavorant.

One or more of the following features can be included in any feasible combination. For example, the ridge(s) can include a plurality of secondary ridges and at least one primary ridge positioned between at least two secondary ridges. The ridge(s) can divert equal portions of the fluid to the plurality of elongate openings. In another example, the plurality of elongate openings can extend concentrically away from a channel opening of the diffuser assembly at which the fluid is received from the reservoir. The plurality of elongate openings can have respective lengths that distribute equal portions of the fluid onto the flavorant within the brew basket.

The details of one or more variations of the subject matter described herein are set forth in the accompanying drawings and the description below. Other features and advantages of the subject matter described herein will be apparent from the description and drawings, and from the claims.

BRIEF DESCRIPTION OF DRAWINGS

The embodiments described above will be more fully understood from the following detailed description taken in conjunction with the accompanying drawings. The drawings are not intended to be drawn to scale. For purposes of clarity, not every component may be labeled in every drawing. In the drawings.

DETAILED DESCRIPTION

Figure 1:
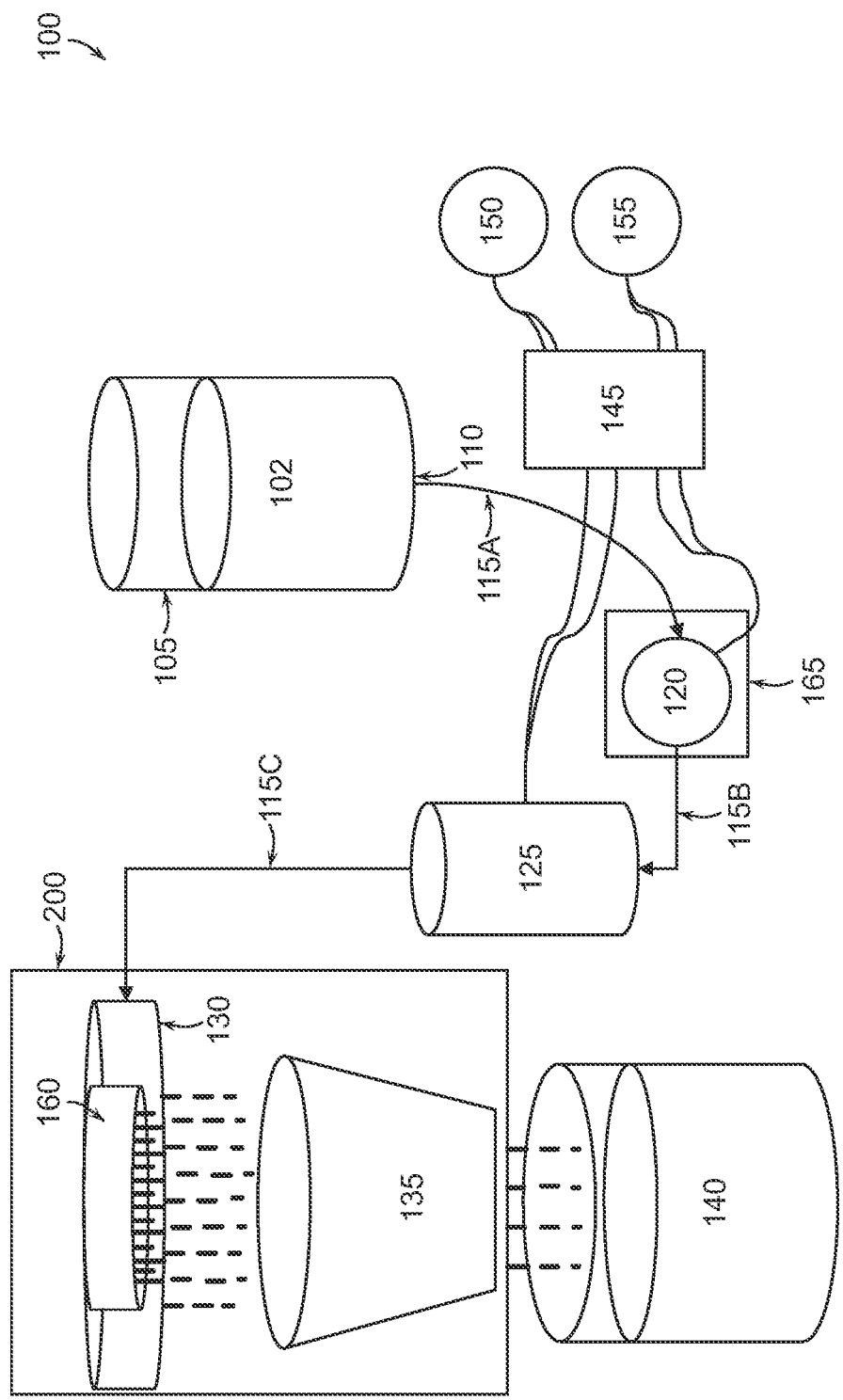
FIG. 1 is a schematic diagram of components of an embodiment of a coffee machine.

Certain embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting embodiments and that the scope of the present invention is defined solely by the claims. The features illustrated or described in connection with one embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape.

Coffee machines can be configured to deliver a fluid, such as water, to a flavorant, such as ground coffee, to brew a coffee beverage. Coffee machines can include showerheads to distribute the fluid onto the ground coffee during the brewing process. It can be advantageous to control an amount, a flow rate, and a distribution pattern of water through the showerhead in order to produce coffee with a pleasant flavor and strength. A showerhead providing water in a sparse or concentrated distribution pattern onto the coffee grounds may result in coffee that is weak in flavor. A showerhead providing too much water onto the coffee grounds may also result in coffee that is weak in flavor. A showerhead providing too little water onto the coffee grounds may result in coffee that is overly strong in flavor. Ideally, fluid will be provided onto the coffee grounds at a uniform flow rate with broad distribution covering the entire surface of the coffee grounds to produce a well-balanced, flavorful coffee.

Accordingly, a diffuser assembly is provided and is configured to provide a more uniform distribution pattern of fluid at a consistent flow rate onto a flavorant, such as ground coffee, held within the coffee machine. The diffuser assembly can be configured within a showerhead such that fluid is provided to the entire inner surface of the showerhead before flowing through the showerhead and onto the ground coffee. By evenly distributing the fluid across the entire inner surface of the diffuser assembly prior to releasing the fluid into the showerhead, a uniform volume of fluid can be provided across a larger surface of area of the showerhead. The resulting fluid flow out of the showerhead can likewise be provided to a larger surface area of the coffee grounds located below the showerhead to produce a more consistent and evenly formed wetting of the ground coffee during brewing. In this way, the flavor and taste of the brewed coffee can be enhanced.

A schematic diagram of one embodiment of a coffee machine that can be used in accordance with embodiments of the present disclosure is illustrated in FIG. 1. As shown, the coffee machine 100 generally includes a water reservoir 105 for holding water 102 to be used for brewing coffee. The water reservoir 105 includes lower outlet 110. A first conduit 115A is attached to the lower outlet 110 of the water reservoir 105 and fluidically connects the lower outlet 110 of the water reservoir to a flow meter 120. In some embodiments, the flow meter 120 can be provided within or can be fluidically coupled to a pump included in the coffee machine 100, such as pump 165. A second conduit 115B fluidically connects the flow meter to a heater/boiler 125. The second conduit 115B can be rated to operate at elevated temperatures, for example, at temperatures up to about 150° C. The heater/boiler 125 is fluidically connected through a third conduit 115C which is coupled to a brew basket assembly 200 of the coffeemaker 100. The first, second, and third conduits 115A, 115B, 115C can be formed from any food safe material, such as food grade silicone tubing, metal tubing such as stainless steel tubing, polymeric tubing, etc.

The brew basket assembly 200 can include a showerhead assembly 130 configured to distribute fluid onto ground coffee disposed in a brew basket 135. The showerhead assembly 130 can include a shower head (not shown) and a diffuser assembly 160 configured to distribute water to the showerhead. The brew basket 135 can be configured to receive ground coffee and to brew the ground coffee when hot water is introduced into the brew basket 135 from the showerhead. The brew basket 135 can direct brewed coffee, either directly, or through one or more outlets, conduits, or chambers of the brew basket assembly 200, into a container 140 such as a carafe, half-carafe, travel mug, or mug. The brew basket 135 may be configured to support a coffee filter in which the ground coffee may be disposed. In some embodiments, the diffuser assembly 160 can be disposed above or within an orifice defined in a lid 131 or upper portion of the showerhead assembly 130.

Operation of the coffee machine 100 can be controlled by a controller 145, which may include any one or more of a microprocessor, microcontroller, application specific integrated circuit (ASIC), or any other form of electronic controller known in the art. The controller 145 can receive input from a user actuating various controls, such as a brew size selection control 150 and/or a temperature control 155 (used to select between hot and iced coffee) and/or any other control which may be included in various embodiments of the coffee machine 100. The controller 145 may be configured to receive a signal from the flow meter 120 and can utilize the signal to calculate an amount of water flowing through the flow meter, and may control the heater/boiler 125 to produce coffee having a volume and/or strength specified by a user. The controller 145 may control operation of the heater/boiler 125 responsive to an amount of water passed through the flow meter 120. In some embodiments, the heater/boiler 125 is an electrical heater which is operable under control of the controller 145 of the coffee machine.

Although the coffee machine 100 is shown with a single fluidic circuit in FIG. 1, in some embodiments, the coffee machine 100 can include multiple fluidic circuits. For example, the coffee machine 100 can include a plurality of reservoirs 105, a plurality of flow meters 120, and/or a plurality of heater/boilers 125, all of which can be respectively coupled by individual conduits to form a plurality of fluidic circuits. In some embodiments, the showerhead assembly 130 and/or the diffuser assembly 160 herein can be fluidically coupled to at least one fluidic circuit of a plurality of fluidic circuits which can be configured in the coffee machine 100 described herein. Further, a person skilled in the art will appreciate that the diffuser assembly can be used in various coffee machines having any configuration known in the art.

Figure 2:
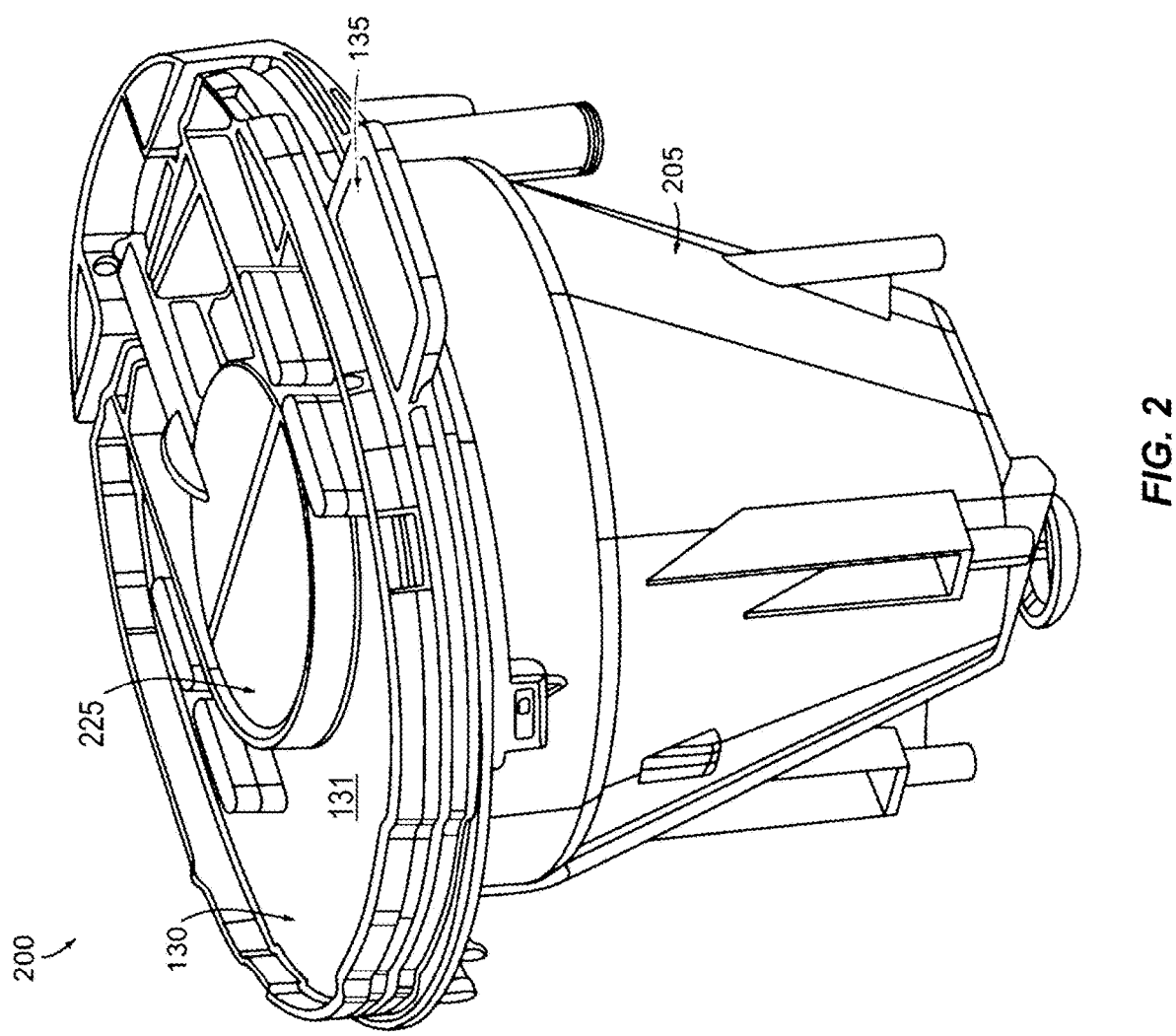
FIG. 2 is top a side perspective view of a brew basket assembly of the coffee machine of FIG. 1.
Figure 3:
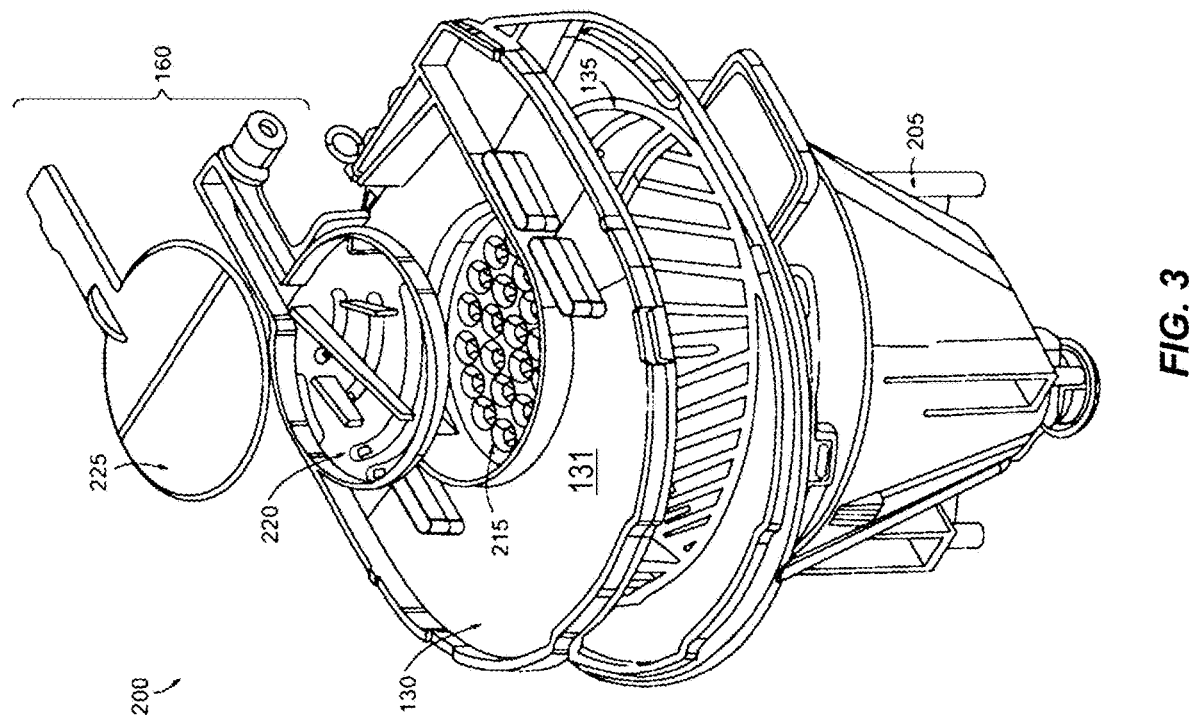
FIG. 3 is an exploded top side perspective view of the brew basket assembly of FIG. 2.

The brew basket assembly 200 is shown in more detail in FIGS. 2 and 3 and generally includes a housing 205, a brew basket 135, a showerhead assembly 130, and a diffuser assembly 160 arranged within the showerhead assembly 130. The brew basket 135 can contain ground coffee and can be positioned within the housing 205. The showerhead assembly 130 can be positioned above the housing 205 and can be fluidically coupled to the reservoir 105 via a fluidic circuit to deliver fluid onto ground coffee in the brew basket 135. The showerhead assembly 130 can include a showerhead 215 as shown in the exploded view of the brew basket assembly of FIG. 3. The showerhead 215 can include a plurality of holes therein. The showerhead assembly 130 can also include a diffuser assembly 160 arranged therein. Fluid can be provided to the showerhead 215 by the diffuser assembly 160. The fluid can then exit the showerhead 215 via the plurality of holes onto the ground coffee held in the brew basket 135 positioned below the showerhead assembly 130.

The diffuser assembly 160 can include a diffuser housing 220 and a cover 225. The cover 225 can be removably coupled to the diffuser housing 225. As indicated above, the diffuser assembly 160 can include features configured within the diffuser housing 220 to distribute the fluid into the showerhead 215 at a substantially consistent rate and in a substantially consistent distribution pattern over the entire surface of the showerhead 215 at which the plurality of holes are located. In this way, equal amounts of fluid can simultaneously exit through all of the holes the showerhead 215, rather than concentrations of fluid distributed only through certain regions or areas of the holes in the showerhead 215. Advantageously, the features can divert the fluid across the entire surface of a diffuser housing 220 of the diffuser assembly 160 prior to flowing into the showerhead 215. By diverting the fluid in this way, more consistent flow rates and distribution patterns of the fluid can be provided.

Figure 4:
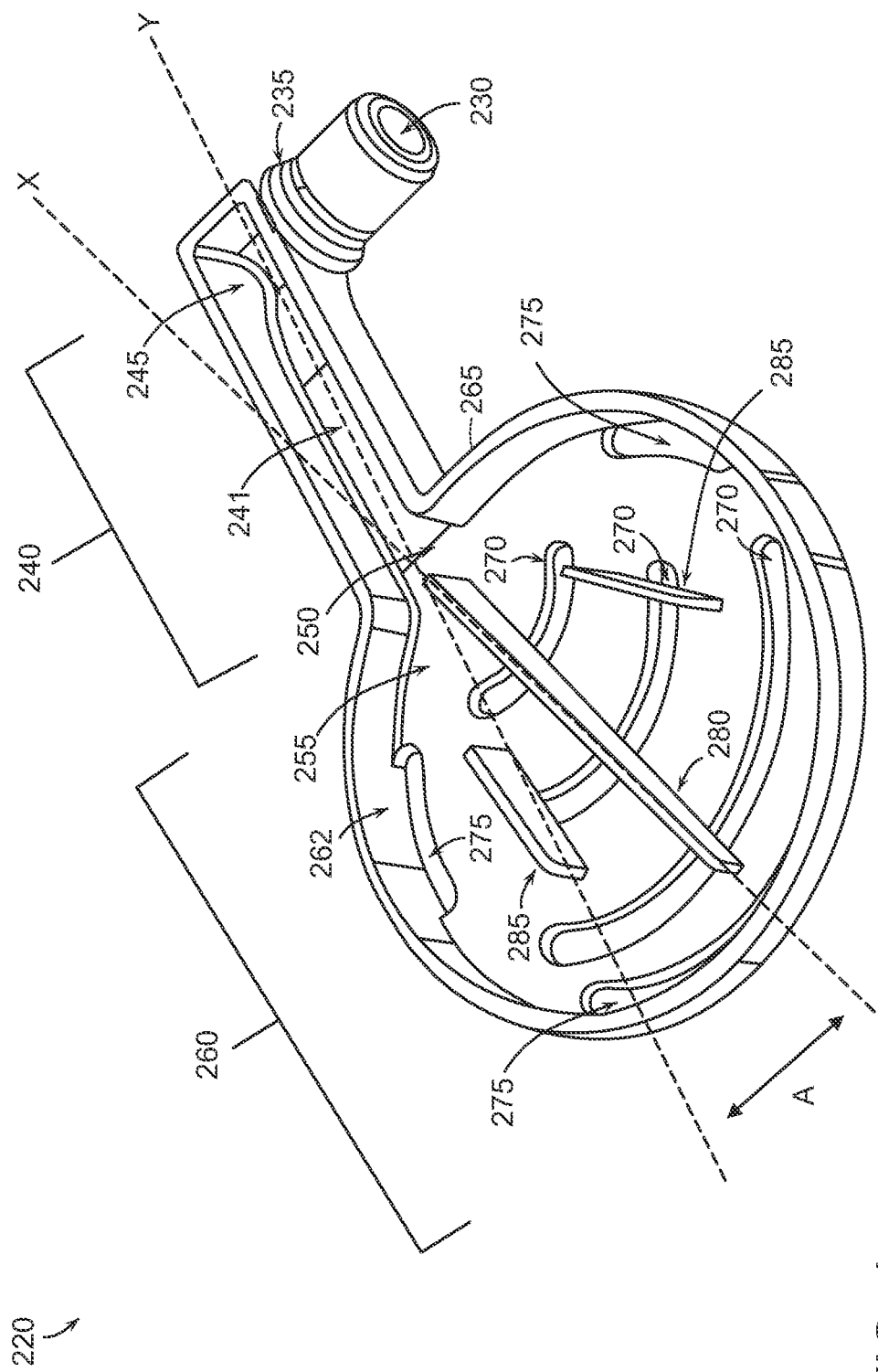
FIG. 4 is top side perspective view of a diffuser housing of the diffuser assembly of FIG. 3.
Figure 5:
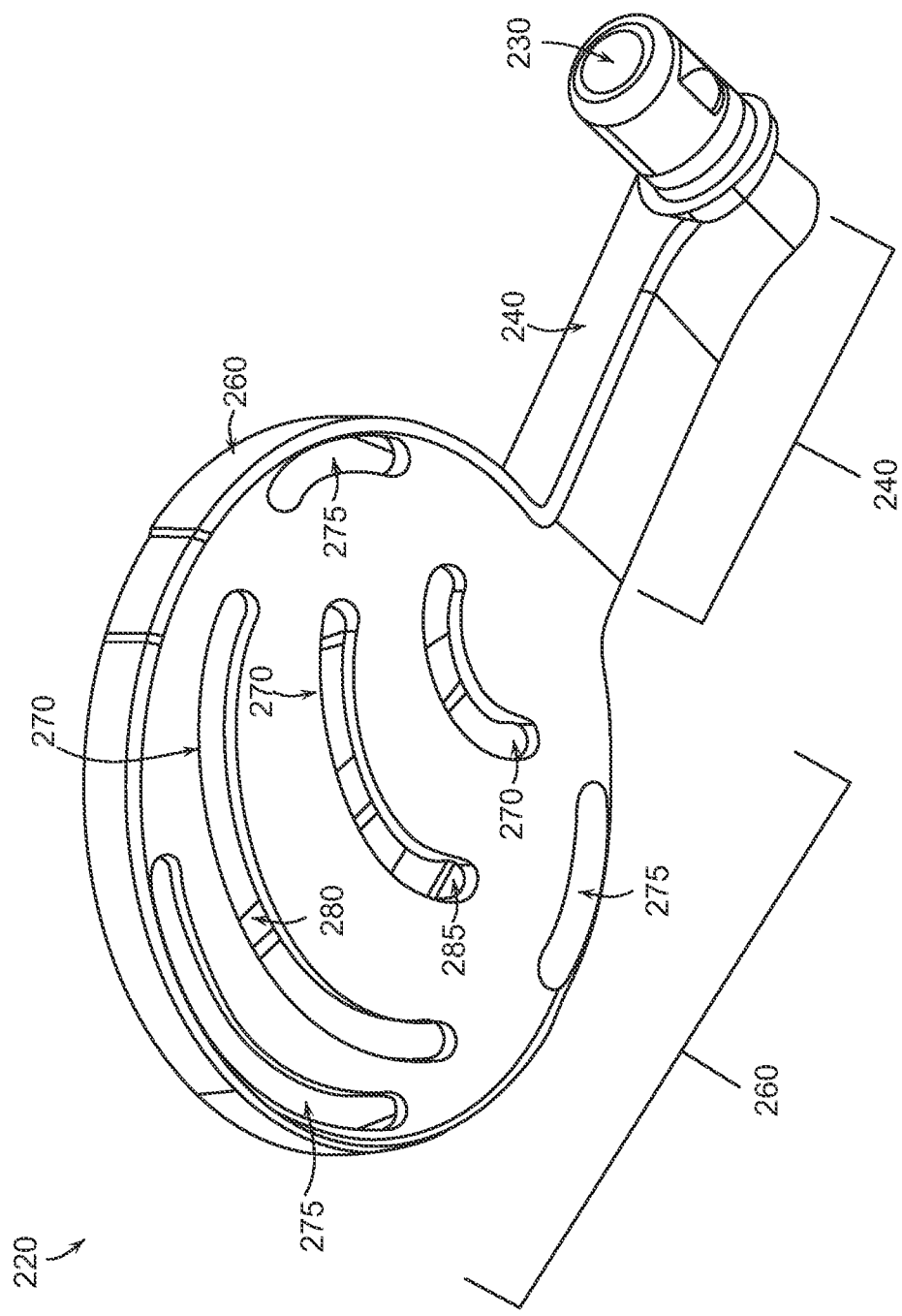
FIG. 5 is a bottom side perspective view of the diffuser housing of FIG. 4.

In one embodiment, as shown in FIGS. 4 and 5, the diffuser housing 220 has a substantially cylindrical portion 260 with an elongate arm 240 extending outward therefrom. The cylindrical portion 260 can be configured in an offset or skewed position with respect to the elongate arm 240. For example, a center line of the cylindrical portion 260 can be located along axis X instead of axis Y, which can extend along a center line of the elongate arm 240. In some embodiments, features of the cylindrical portion can be oriented with respect to the offset position and the outlet end 250 of the channel 241. Advantageously, the offset positioning of the cylindrical portion 260 relative to the elongate arm 240 (and the channel 241 therein) provides better flow control to ensure fluid is sufficiently distributed across the entire surface of the cylindrical portion 260 before exiting the diffuser housing 220 via the openings 270, 275.

The elongate arm 240 can include define a channel 241 there through for receiving fluid from an inlet port 230 at the end of the elongate arm 240, and for delivering fluid to the cylindrical portion 260. In some embodiments, a gasket 235 can be positioned between the inlet port 230 and the channel 241. The channel 241 can include an inlet end 245 at which fluid is received from the inlet port 230 and an outlet end 250 at which the fluid is distributed onto the inner surface 255 of the cylindrical portion 260. A sidewall 265 can projected upward along the entire perimeter of the cylindrical portion 260 and elongate arm 240. The sidewall 265 can aid in retaining fluid within the diffuser housing 220. The removable cover 225 can detachably couple to the wall 265 to define an enclosed chamber within the diffuser housing 220 for allowing fluid flow there through.

As further shown in FIGS. 4 and 5, the inner surface 255 can include a plurality of features configured to divert and distribute the fluid flow existing the outlet end 250 of the channel 241. In one embodiment, the inner surface 255 can include multiple openings for allowing fluid to flow through the diffuser housing 220, and multiple ridges intersecting the openings. The ridges can divert the fluid equally and uniformly across the inner surface 255 so that an equal volume of fluid passes into the openings. The openings can be variably sized and positioned to control the flow rate exiting the diffuser housing 220 so that an equal volume of fluid exits the diffuser housing 220 at the same time and the fluid is not concentrated in one area or region of the diffuser housing 220. The arrangement of openings and ridges on the surface of the cylindrical housing 260 can enhance fluid diversions and flow control of the diffuser assembly 220. For example, the openings can include variably sized openings in selected locations to ensure that an equal volume of fluid received at the outlet end 250 is provided through each of the openings. Similarly, the ridges can have different heights, lengths, and angles (relative to a centerline of the cylindrical portion 260, e.g., axis X) that can be selected to ensure that fluid is evenly distributed from the outlet end 250 of the channel 241 onto and across the inner surface 255 of the diffuser housing 220. In this way, the openings 270, 275 each receive the fluid simultaneously and the openings 270, 275 can provide a pattern of fluid onto the ground coffee in a pattern that is as large as possible and corresponds to the entire area of the inner surface 255 of the cylindrical portion 260.

While the openings can vary, in one embodiment the openings can be in the form of arc-shaped elongate openings. For example, a first group of variably sized openings 270 can be arranged in a concentric manner relative to one another, with the openings extending away from the outlet end 250 of the channel 241 and extending transversely across the inner surface 255 of the diffuser housing 220. In particular, as shown in FIGS. 4 and 5, the first group of openings includes three openings, each extending substantially perpendicular to an axis X that extends transverse to an axis Y of the channel 241, and each being spaced apart along the axis X. The angle A between axis X and axis Y can vary, but in one embodiment axis X extends less than 90 degrees relative to axis Y.

The length of each of the three openings 270 can also vary, and in one embodiment the length can increase with the opening closest to the channel 241 being the shortest and the opening farthest from the channel 241 being the longest. The distance between the openings can also vary, and in one embodiment the openings 270 can be separated from one another by a distance of about 5 mm to 40 mm as measured along the axis X. The size of the openings 270 can be configured to more efficiently distribute fluid across the entire inner surface 255. For example, fluid can flow over a smaller first opening 270 closest to the outlet end 250 because it is smaller in size. The fluid can then proceed toward the mid-size second opening 270 and on to a larger third opening 270 resulting in a fluid flow that enters all of the openings 270 as synchronously as possible. The resulting flow out of the diffuser assembly 220 is broadly distributed onto coffee grounds below in an area that corresponds to the surface area of the cylindrical portion 260, thus maximizing the fluid distribution across a greater amount of the usable surface area of the diffuser assembly 220.

A second group of openings 275 can also be provided on the inner surface 255 of the diffuser housing 220. The second group of openings 275 can differ in shape and length from the first group of openings 270, and as well from one another. The second group of openings 275 may not be concentric with respect to one another or to the first group of openings 270. Instead, the second group of openings can be arranged about the circumference of the inner surface 255. In particular, the second group of openings 275 can include two short openings positioned adjacent a circumference of the inner surface 255 on opposed sides of the outlet end 250 of the channel 241, and one longer opening positioned adjacent the circumference of the inner surface 255 on a side opposite the outlet end 250 of the channel 241.

Each opening 270, 275 can have an elongate shape forming an arc. In some embodiments, the openings 270, 275 can include a variety of other shapes without limit. For example, the openings 270, 275 can have rectilinear shapes, circular shapes, and/or ellipsoid shapes. In some embodiments, the openings 270, 275 can include different shaped openings. In some embodiments, the openings 270 can have an arc length in a range of about 10 mm to 80 mm. In some embodiments, the openings 275 can have an arc length in a range of about 15 mm to 75 mm. In some embodiments, the openings 270, 275 can have a width in a range of about 1 mm to 10 mm.

The diffuser housing 220 can also include several ridges to divert fluid equally and uniformly across the inner surface 255 and to the openings. The ridges can project from the inner surface 255 and in an illustrative embodiment can include a primary ridge 280 and at least two secondary ridges 285. The ridges can intersect the first group of openings 270. The primary ridge 280 can extend along axis Z, which extends at an acute angle relative to the axis Y of the channel 241. The secondary ridges 285 are spaced laterally away from axis X and extend transverse to the axis Y of the channel 241. Accordingly, the primary ridge 280 and the secondary ridges 285 are not parallel, but rather are angled relative to one another. In use, fluid is diverted from the outlet end 250 into channels formed on either side of the primary ridge 280 and the secondary ridges 285 and into the first group of openings 270 and the group plurality of openings 275. The synergistic function of the ridges (e.g., ridges 280 and 285) and the openings (e.g., openings 270 and 275) provide fluid diversion and control necessary to enable a uniformly distributed volume of fluid to be collected within the diffuser housing 220 before it exits via the diffuser assembly 160 into the showerhead 215.

The primary ridge 280 and/or the secondary ridges 285 can have a linear shape. In some embodiments, the primary ridge 280 and/or the secondary ridges 285 can have a non-linear or curved shape. In some embodiments, the primary ridge 280 and/or the secondary ridges 285 can have a uniform height along their length. In some embodiments, the height of any respective ridge of the primary ridge 280 and/or the secondary ridges 285 can vary along the length of a respective ridge. In some embodiment's, the height of the primary ridge 280 can vary from the height of the secondary ridges 285. In some embodiment's, the height of the primary ridge 280 can be the same as the height of the ridges secondary ridges 285. In some embodiments, the primary ridge 280 and the secondary ridges 285 can have a height in a range of about 1 mm to 12 mm. In some embodiments, the primary ridge 280 can have a length in a range of about 15 mm to 75 mm. In some embodiments, the secondary ridges 285 can have a length in a range of about 5 mm to 30 mm. In some embodiments, the secondary ridges 285 can be in a range of about 8 mm to 25 mm away from the primary ridge 280.

The position of the ridges relative to the channel 241 can also vary. For example, the primary ridge 280 can be positioned relative to the outlet end 250 of the channel 241 to efficiently distribute fluid into the openings 270. The secondary ridges 285 can be positioned relative to the primary ridge 280 to efficiently distribute fluid into the openings 275. The arrangement of the primary ridge 280 and the openings 270 relative to one another can be selected to ensure maximal distribution of fluid from the outlet end 250 into each of the variable sized openings 270. Similarly, the arrangement of the secondary ridges 285 and the openings 275 relative to one another can be selected to also ensure maximal distribution of fluid from the outlet end 250 into each of the variably sized openings 275. The arrangement of the secondary ridges 285 and the openings 275 relative to one another can also be selected with respect to the arrangement of the primary ridge 280 and/or the openings 270 as fluid which is not diverted by the primary ridge 280 into the openings 270 can be diverted by the secondary ridges 285 into the secondary openings 275. In this way, for a given amount of fluid exiting the outlet end 250 in a unit of time, the fluid is rapidly and fully distributed across the entire inner surface 255 of the cylindrical portions 260 and into the openings 270 and 275 in a near simultaneous manner. This can produce a fluid flow pattern from the diffuser assembly 220 that is broadly distributed across the entire surface area of the diffuser assembly 220 and provides uniform delivery of volumes of fluid from all of the openings nearly instantaneously.

Figure 6:
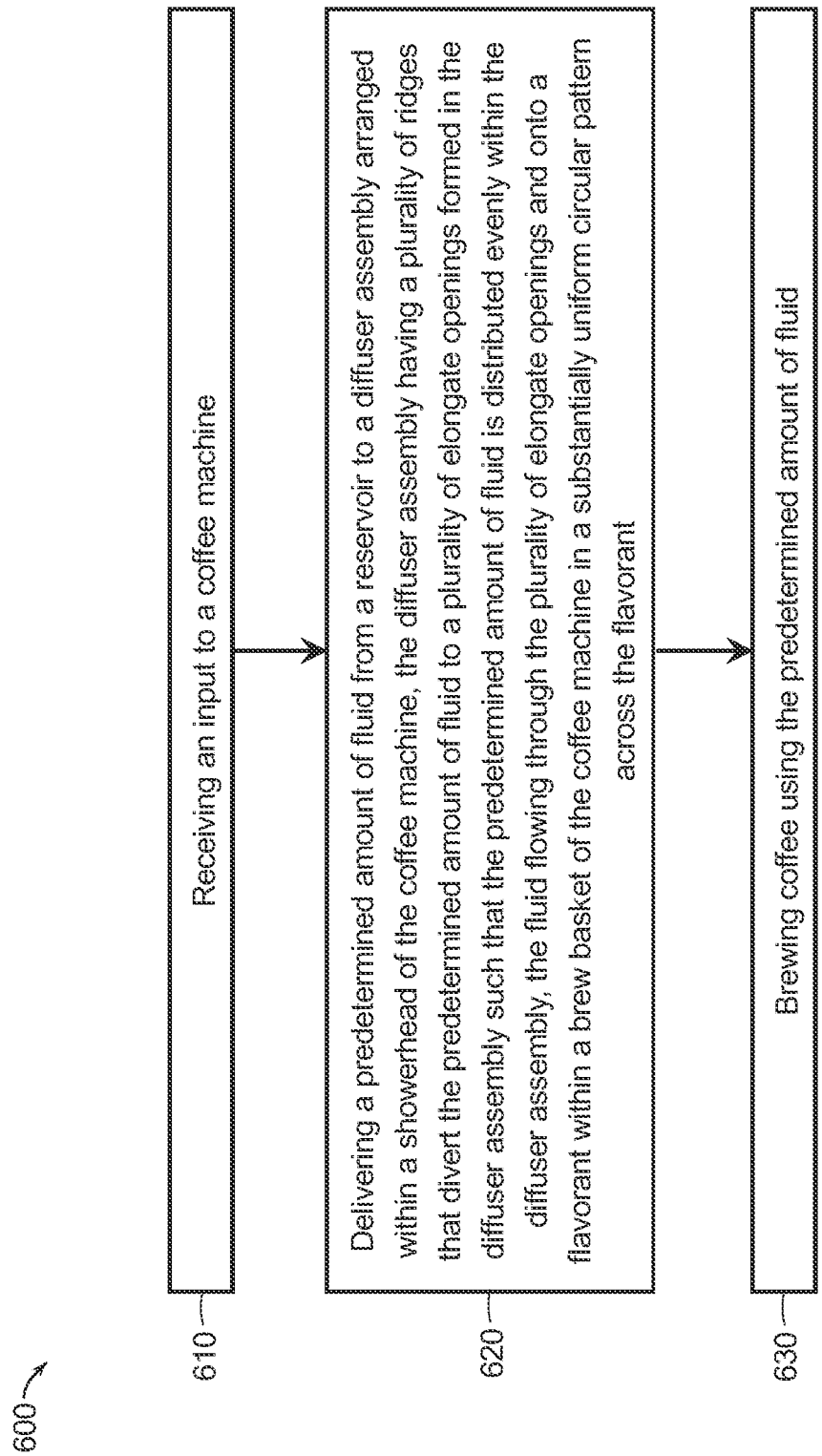
FIG. 6 is a process flow diagram of one embodiment of a method of brewing coffee with the coffee machine of FIG. 1.

Operation of the coffee machine 100 can be performed by a user to brew a beverage, such as a coffee. A user can provide ground coffee into the brew basket 135 upon which fluid, such as water, can be provided. FIG. 6 illustrates one illustrative process for brewing coffee. In operation 610 of FIG. 6, the controller 145 of the coffee machine 100 can receive an input from a user, such as an input from a brew size selection control 150 and/or a temperature control 155. In some embodiments, the controller 145 can receive an input from a beverage type control. In operation 620, the controller 145 can generate control signals causing the pump 165 to deliver fluid from the reservoir 102 to the diffuser assembly 160 arranged within the showerhead 215 of the coffee machine 100. The diffuser assembly 160 can have ridges 280, 285 that divert the fluid to the elongate openings 270, 275 formed in the diffuser assembly 160. The fluid can be distributed evenly within the diffuser assembly 160 via the primary ridge 280 and the secondary ridge 285 and can flow onto a flavorant within a brew basket 135 of the coffee machine 100 in a substantially uniform circular pattern across the flavorant. In operation 630, the coffee machine can brew the coffee using the fluid.

In some embodiments, the fluid can correspond to an amount of bloom water used to wet the ground coffee during an initial bloom phase of a brewing cycle. In some embodiments, the fluid can correspond to an amount of brew water used to brew the ground coffee during a brew phase of the brewing cycle. The brew phase can follow the initial bloom phase of the brewing cycle. The diffuser assembly 160 described herein can improve wetting the ground coffee before and during a brewing cycle to improve the resulting flavor profile and taste characteristics of the brewed coffee. It has been discovered that pre-soaking of ground coffee with water in, for example, a brew basket of a coffee machine prior to delivering the majority of the hot water used to brew the coffee to the brew basket may result in brewed coffee having a more pleasant taste than brewed coffee produced in the absence of pre-soaking the ground coffee.

The water used for pre-soaking the ground coffee may be referred to herein as "bloom water" and the amount of time the bloom water is exposed to the ground coffee to presoak the ground coffee is "bloom time." The water used to brew the coffee from the ground coffee in addition to the bloom water will be referred to herein as "brew water." The brew water is delivered to the ground coffee after completion of presoaking of the ground coffee with the bloom water for the bloom time. It has been discovered that a ratio of an amount of bloom water to an amount of brew water, in addition to other factors, for example, a total volume of water used to brew coffee from a given volume and/or mass of ground coffee and the temperature of the water used to brew the coffee should be controlled to produce well balanced and pleasantly tasting coffee.

EXAMPLES

Experimental data is provided that illustrates the improved fluid distribution provided by a showerhead assembly including the diffuser assembly 160 described herein compared to traditional showerhead assemblies which do not include the improved diffuser assembly 160 herein. Images in FIGS. 7A-9B show the improved fluid distribution pattern provided by the diffuser assembly 160 in pre-bloom, bloom-start, and bloom-end phases of a brewing cycle performed by the coffee machine 100 described herein.

Figure 7A:
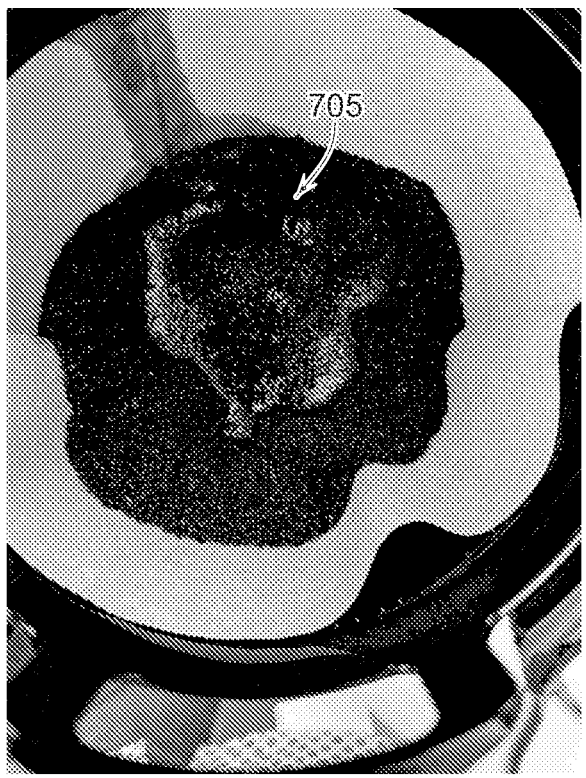
FIG. 7A is an image of a pre-bloom distribution pattern of fluid provided onto ground coffee grounds by a traditional diffuser.
Figure 7B:
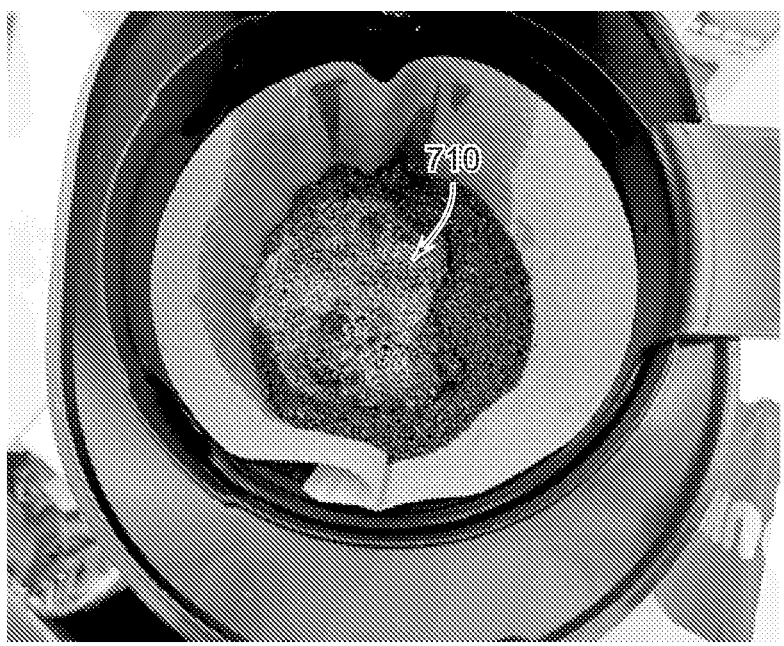
FIG. 7B is an image of a pre-bloom distribution pattern of fluid provided onto ground coffee grounds by an embodiment of the diffuser assembly described herein.

A comparison of pre-bloom fluid distribution can be seen in FIGS. 7A-7B. As shown in FIG. 7B, the fluid distribution pattern 710 provided by the diffuser assembly 160 onto the ground coffee is greater in size and is more evenly distributed across the surface of the ground coffee compared to the distribution pattern 705 shown in FIG. 7A provided by a traditional showerhead assembly.

Figure 8A:
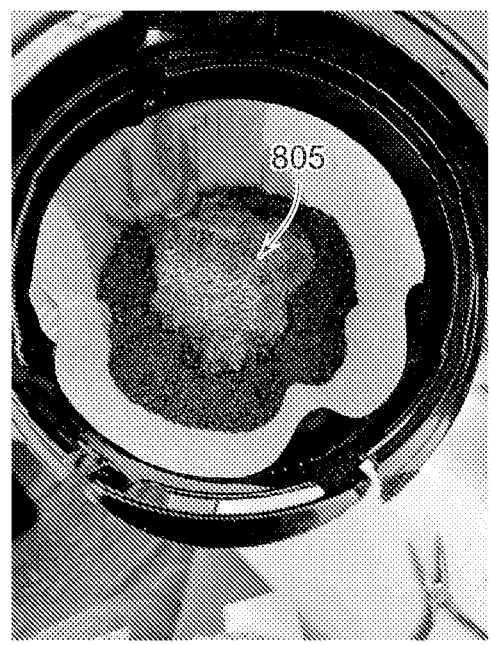
FIG. 8A is an image of a bloom-start distribution pattern of fluid provided onto ground coffee grounds provided by a traditional diffuser.
Figure 8B:
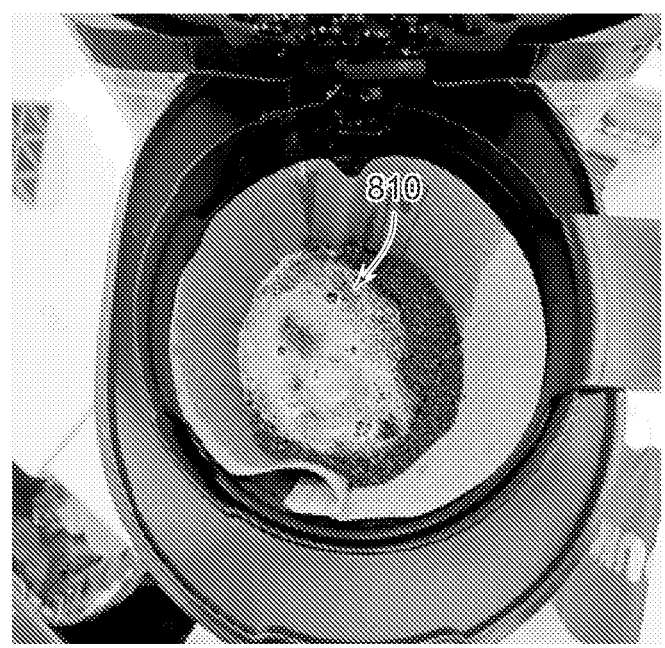
FIG. 8B is an image of a bloom-start distribution pattern of fluid provided onto ground coffee grounds provided by an embodiment of the diffuser assembly described herein.

During bloom-start, as shown in FIGS. 8A and 8B, the fluid distribution pattern 810 provided by the diffuser assembly 160 onto the ground coffee is greater in size and more evenly and fully distributed across the surface of the ground coffee compared to the distribution pattern 805 shown in FIG. 8A provided by a traditional showerhead assembly.

Figure 9A:
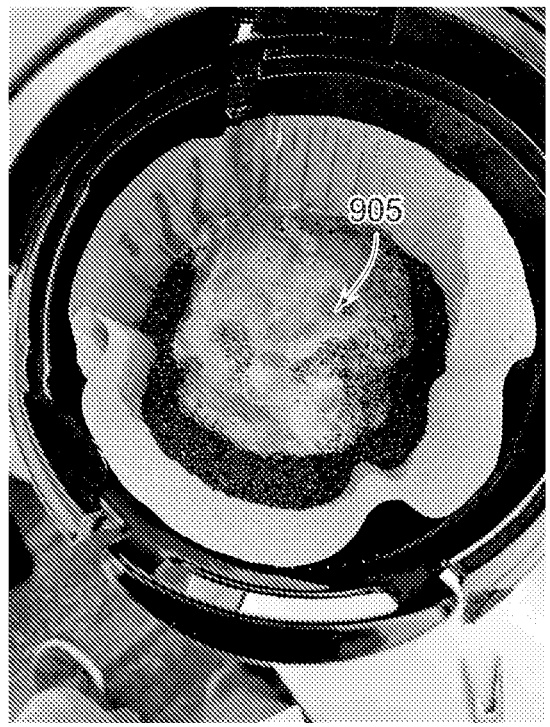
FIG. 9A is an image of a bloom-end distribution pattern of fluid provided onto ground coffee grounds provided by a traditional diffuser.
Figure 9B:
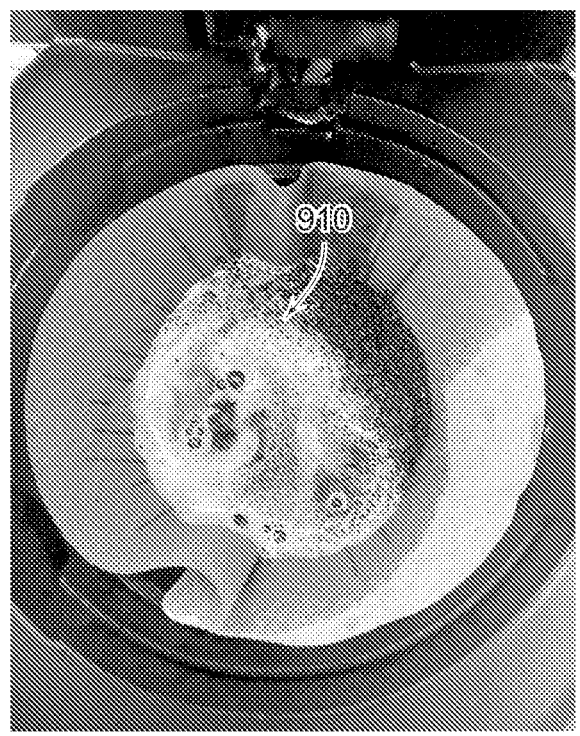
FIG. 9B is an image of a bloom-end distribution pattern of fluid provided onto ground coffee grounds provided by an embodiment of the diffuser assembly described herein.

Similarly, at bloom-end, as shown in FIGS. 9A and 9B, the fluid distribution pattern 910 provided by the diffuser assembly 160 onto the ground coffee is greater in size and more evenly and fully distributed across the entire surface of the ground coffee compared to the distribution pattern 905 shown in FIG. 9A provided by a traditional showerhead assembly.

The diffuser assembly 160 herein can provided a greater surface area of fluid distribution and ground coffee wetting in any phase of a brewing cycle compared to a traditional diffuser assembly or a traditional showerhead assembly.

Illustrative technical effects of the systems, apparatuses, and methods described herein include, by way of non-limiting example, distributing a uniform volume of a fluid in a consistent distribution pattern to a showerhead of a coffee maker for brewing a beverage. The diffuser assembly described herein can provide an evenly distributed volume of fluid to a showerhead and onto a flavorant used to brew the beverage. As a result, the flavorant can be wetted in a substantially uniform manner across an amount of the flavorant so as to avoid concentrations or sparse areas of fluid wetting. The taste and quality of the brewed beverage can be improved as a result of wetting the flavorant uniformly with the distributed volume of fluid provided into the showerhead by the diffuser assembly described herein.

Certain illustrative embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting illustrative embodiments and that the scope of the present invention is defined solely by the claims. The features illustrated or described in connection with one illustrative embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

What is claimed is:

1. A coffee machine for brewing a beverage, the coffee machine comprising:
   a reservoir containing a fluid for brewing the beverage; and
   a brew basket assembly in fluid communication with the reservoir, the brew basket assembly comprising a brew basket and a showerhead assembly having a lid positioned above the brew basket, the brew basket configured to hold a flavorant and to receive the fluid from the reservoir,
   the showerhead assembly further comprising
   a diffuser assembly within the lid having at least one ridge arranged on an inner surface thereof configured to divert the fluid to a plurality of elongate openings formed in the diffuser assembly such that the fluid is evenly distributed across the inner surface of the diffuser assembly in a substantially uniform circular pattern, and
   a showerhead within the lid, the showerhead spaced apart from and positioned below the diffuser assembly and configured to receive the fluid from the reservoir via the diffuser assembly and to provide the fluid to the brew basket atop the flavorant.

2. The coffee machine of claim 1, wherein each of the plurality of elongate openings is substantially arc-shaped.

3. The coffee machine of claim 2, wherein the plurality of elongate openings comprise a first plurality of elongate openings and a second elongate opening, and wherein the first plurality of elongate openings are arranged concentric relative to one another, and the second elongate opening is not concentric with the first plurality of elongate openings.

4. The coffee machine of claim 1, wherein each of the plurality of elongate openings differ in size relative to one another.

5. The coffee machine of claim 1, wherein each of the plurality of elongate openings has a length that differs relative to one another.

6. The coffee machine of claim 1, wherein the at least one ridge intersects the plurality of elongate openings.

7. The coffee machine of claim 1, wherein the at least one ridge includes a primary ridge having a first length and a plurality of secondary ridges having a second length that is less than the first length.

8. The coffee machine of claim 7, wherein the primary ridge is positioned between the plurality of secondary ridges.

9. A coffee machine for brewing a beverage, the coffee machine comprising:
   a reservoir containing a fluid for brewing the beverage; and
   a brew basket assembly in fluid communication with the reservoir, the brew basket assembly having a brew basket with an opening therein configured to receive a flavorant within the brew basket, and a showerhead assembly having a lid positioned a distance above the brew basket, the showerhead assembly including a diffuser assembly in the lid configured to uniformly distribute the fluid received from the reservoir, and a showerhead in the lid configured to receive the uniformly distributed fluid from the diffuser assembly and to provide the fluid onto the flavorant in the brew basket.

10. The coffee machine of claim 9, wherein the showerhead assembly encloses the opening of the brew basket.

11. The coffee machine of claim 9, wherein the diffuser assembly includes a cover removably coupled to a diffuser housing.

12. The coffee machine of claim 11, wherein the diffuser housing comprises an inlet fluidically coupled to the reservoir and a channel fluidically coupled to the inlet, the channel having an elongate shape.

* * * * *